(12) United States Patent
Katsuta et al.

(10) Patent No.: US 10,062,514 B2
(45) Date of Patent: Aug. 28, 2018

(54) MULTILAYER CERAMIC CAPACITOR

(71) Applicant: Murata Manufacturing Co., Ltd., Nagaokakyo-shi, Kyoto-fu (JP)

(72) Inventors: Seiji Katsuta, Nagaokakyo (JP); Yosuke Terashita, Nagaokakyo (JP); Takayoshi Yamamoto, Nagaokakyo (JP); Atsushi Ishida, Nagaokakyo (JP); Kota Zenzai, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/484,370

(22) Filed: Apr. 11, 2017

(65) Prior Publication Data

US 2017/0294268 A1    Oct. 12, 2017

(30) Foreign Application Priority Data

Apr. 12, 2016    (JP) ................. 2016-079795

(51) Int. Cl.
*H01G 4/30*      (2006.01)
*H01G 4/232*     (2006.01)
(Continued)

(52) U.S. Cl.
CPC ............... *H01G 4/30* (2013.01); *H01G 4/012* (2013.01); *H01G 4/10* (2013.01); *H01G 4/1227* (2013.01); *H01G 4/1236* (2013.01); *H01G 4/232* (2013.01)

(58) Field of Classification Search
None
See application file for complete search history.

(56) References Cited

U.S. PATENT DOCUMENTS 5,742,473 A * 4/1998 Sano ..................... C04B 35/468
                                                        361/303
6,381,117 B1 * 4/2002 Nakagawa ............... H01G 2/14
                                                        361/301.4
(Continued)

FOREIGN PATENT DOCUMENTS

JP        11-162771 A     6/1999
JP        2009-200421 A   9/2009
(Continued)

OTHER PUBLICATIONS

Official Communication issued in corresponding Korean Patent Application No. 10-2017-0039243, dated Jan. 30, 2018.

(Continued)

*Primary Examiner* — Dion R Ferguson
(74) *Attorney, Agent, or Firm* — Keating & Bennett, LLP

(57) ABSTRACT

In a multilayer ceramic capacitor, outer electrodes include base electrode layers including a conductive metal and a glass component on a ceramic multilayer body, conductive resin layers including a thermosetting resin and a metal component on the base electrode layers such that exposed portions of the base electrode layers are exposed at least at one corner on one end surface side of the ceramic multilayer body and at least at one corner on the other end surface side thereof, and plating layers on the conductive resin layers and the exposed portions of the base electrode layers. The exposed portions of the base electrode layers are in direct contact with the plating layers at least at one corner on the one end surface side of the ceramic multilayer body and at least at one corner on the other end surface side thereof.

20 Claims, 6 Drawing Sheets

(51) Int. Cl.
H01G 4/012 (2006.01)
H01G 4/10 (2006.01)
H01G 4/12 (2006.01)

(56) References Cited

U.S. PATENT DOCUMENTS

| | | | | |
|---|---|---|---|---|
| 8,988,856 B2* | 3/2015 | Oh | ........................ | H01G 4/008 |
| | | | | 361/301.4 |
| 9,418,790 B2* | 8/2016 | Takeuchi | ................ | H01G 4/005 |
| 2011/0024175 A1 | 2/2011 | Satou | | |
| 2011/0051314 A1 | 3/2011 | Sakurai et al. | | |
| 2015/0043125 A1* | 2/2015 | Park | ........................ | H01G 4/12 |
| | | | | 361/301.4 |
| 2015/0162132 A1* | 6/2015 | Kwag | .................... | H01G 4/30 |
| | | | | 174/260 |
| 2015/0243439 A1* | 8/2015 | Kwag | .................... | H01G 4/012 |
| | | | | 174/260 |
| 2016/0211074 A1* | 7/2016 | Gu | ........................ | H01G 2/065 |
| 2016/0212850 A1* | 7/2016 | Kainuma | ................ | H01G 4/232 |
| 2016/0268044 A1* | 9/2016 | Gu | ........................ | H01G 4/12 |

FOREIGN PATENT DOCUMENTS

| | | |
|---|---|---|
| JP | 2011-049515 A | 3/2011 |
| JP | 2011-054642 A | 3/2011 |
| JP | 5082919 B2 | 11/2012 |
| JP | 2013-098540 A | 5/2013 |
| JP | 5676536 B2 | 2/2015 |

OTHER PUBLICATIONS

Official Communication issued in Chinese Patent Application No. 201710230694.1, dated Jun. 5, 2018.

* cited by examiner

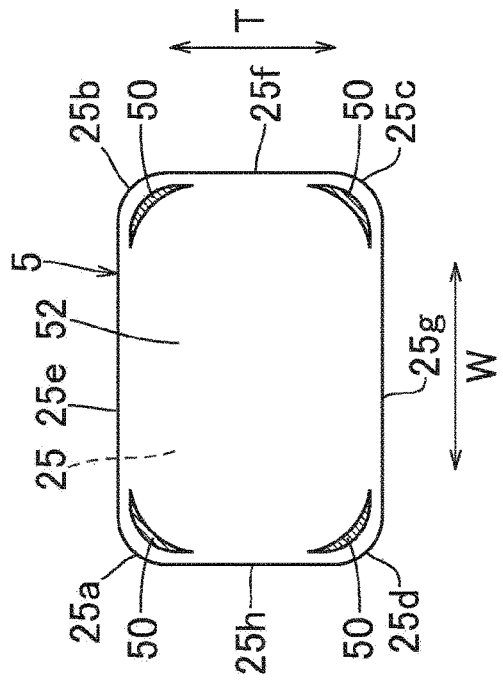
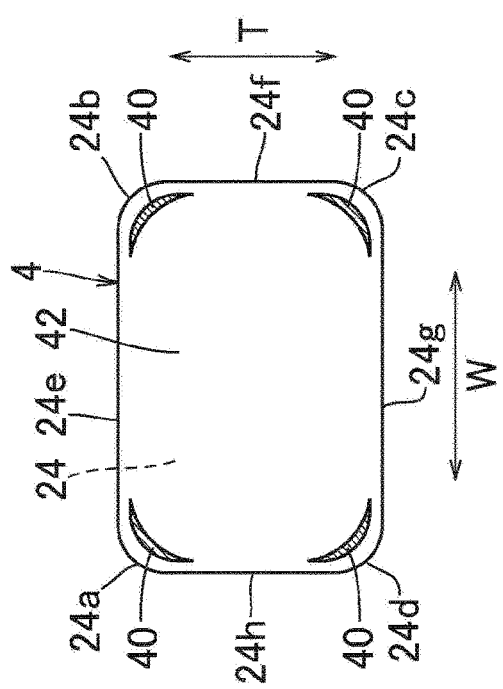
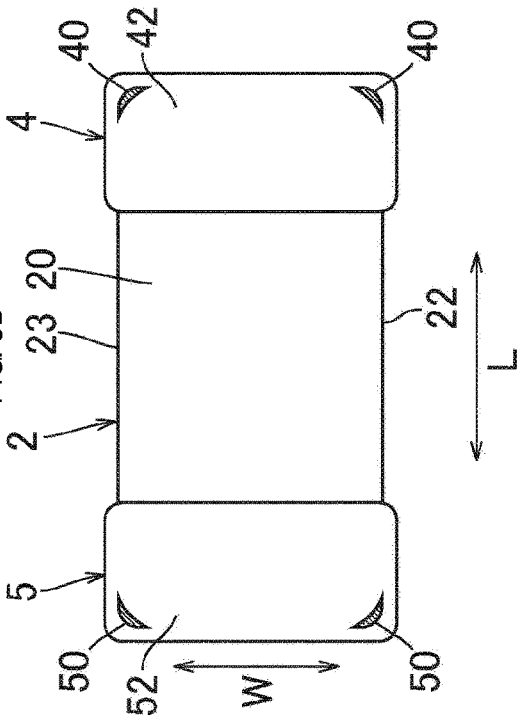
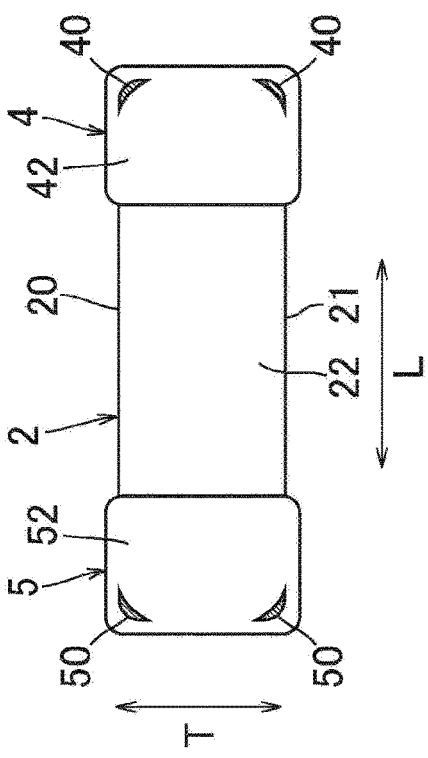

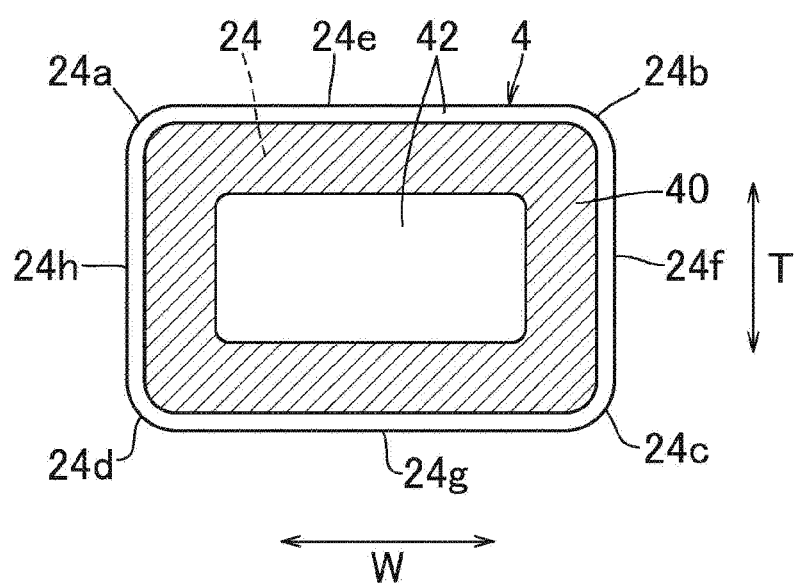

MULTILAYER CERAMIC CAPACITOR

CROSS REFERENCE TO RELATED APPLICATIONS

This application claims the benefit of priority to Japanese Patent Application No. 2016-079795 filed on Apr. 12, 2016. The entire contents of this application are hereby incorporated herein by reference.

BACKGROUND OF THE INVENTION

1. Field of the Invention

The present invention relates to multilayer ceramic capacitors.

2. Description of the Related Art

Multilayer ceramic electronic components such as multilayer ceramic capacitors and the like have been used in a variety of electronic apparatuses. A multilayer ceramic capacitor generally includes a ceramic multilayer body in which a first inner electrode and a second inner electrode are disposed with a ceramic dielectric layer interposed therebetween, and outer electrodes that are formed on both end portions of the ceramic multilayer body.

In recent years, the severity of the environments in which multilayer ceramic capacitors are used has significantly increased. For example, multilayer ceramic capacitors that are used in mobile apparatuses such as cellular phones, portable audio players, and the like are required to withstand the shock of a fall. To be specific, it is necessary to prevent a multilayer ceramic capacitor from falling off of the mounting substrate even if the multilayer ceramic capacitor receives the shock of a fall. Further, it is necessary to prevent the generation of cracks in the multilayer ceramic capacitor.

In addition, multilayer ceramic capacitors used in on-vehicle devices such as an ECU (electronic control unit) and the like are required to be heat-resistant. To be specific, it is necessary to prevent the generation of cracks in a multilayer ceramic capacitor even if a flexural stress is generated due to thermal shrinkage or thermal expansion of the mounting substrate or a tensile stress applied to a first outer electrode and a second outer electrode of the multilayer ceramic capacitor. When the above-mentioned flexural stress and/or tensile stress exceeds the strength of the ceramic multilayer body, a crack is generated in the ceramic multilayer body.

As such, Japanese Unexamined Patent Application Publication No. 11-162771 discloses a technique in which, by using a conductive epoxy-based thermosetting resin containing metal powder for outer electrodes of a multilayer ceramic capacitor, a stress received from the substrate is somewhat alleviated so that the generation of a crack in a ceramic multilayer body is reduced even in a severe environment.

However, when, like in Japanese Unexamined Patent Application Publication No. 11-162771, an outer electrode has a structure in which a conductive epoxy-based thermosetting resin layer, a nickel plating layer, and a tin-based plating layer are formed in that order on a baking electrode layer as a base electrode layer, there arises a problem in that equivalent series resistance (ESR) becomes excessively high due to the presence of the epoxy-based thermosetting resin layer with excessively high resistivity, although it is a conductive material, in comparison with a regular outer electrode that does not include a conductive resin layer.

SUMMARY OF THE INVENTION

Preferred embodiments of the present invention provide multilayer ceramic capacitors each including an outer electrode with an equivalent series resistance (ESR) that is significantly reduced even when a conductive resin layer is disposed between a base electrode layer and a plating layer of the outer electrode.

A multilayer ceramic capacitor according to a preferred embodiment of the present invention includes a ceramic multilayer body, in which a plurality of ceramic dielectric layers that are each provided with a corresponding first inner electrode on a surface thereof, another plurality of ceramic dielectric layers that are each provided with a corresponding second inner electrode on a surface thereof, and another plurality of ceramic dielectric layers provided with no inner electrode are laminated, including a first principal surface and a second principal surface opposing each other in a lamination direction of the plurality of ceramic dielectric layers, a first side surface and a second side surface opposing each other in a width direction of the ceramic multilayer body perpendicular or substantially perpendicular to the lamination direction, and a first end surface and a second end surface opposing each other in a lengthwise direction of the ceramic multilayer body perpendicular or substantially perpendicular to the lamination direction as well as to the width direction; a first outer electrode that is provided on the first end surface of the ceramic multilayer body on which the first inner electrodes are exposed, and end portions of the first outer electrode extend to the first and second principal surfaces and the first and second side surfaces of the ceramic multilayer body; and a second outer electrode that is provided on the second end surface of the ceramic multilayer body on which the second inner electrodes are exposed, and end portions of the second outer electrode extend to the first and second principal surfaces and the first and second side surfaces of the ceramic multilayer body, wherein the first outer electrode includes a first base electrode layer including a conductive metal and a glass component and being disposed on a surface of the ceramic multilayer body; a first conductive resin layer including a thermosetting resin and a metal component disposed on the first base electrode layer such that an exposed portion of the first base electrode layer is exposed at least at one corner on the first end surface side of the ceramic multilayer body; and a first plating layer that is disposed on the first conductive resin layer and on the exposed portion of the first base electrode layer, the exposed portion of the first base electrode layer is in direct contact with the first plating layer at least at the one corner on the first end surface side of the ceramic multilayer body, the second outer electrode includes a second base electrode layer including a conductive metal and a glass component disposed on a surface of the ceramic multilayer body; a second conductive resin layer including a thermosetting resin and a metal component disposed on the second base electrode layer such that an exposed portion of the second base electrode layer is exposed at least at one corner on the second end surface side of the ceramic multilayer body; and a second plating layer that is disposed on the second conductive resin layer and on the exposed portion of the second base electrode layer; and the exposed portion of the second base electrode layer is in direct contact with the second plating layer at least at the one corner on the second end surface side of the ceramic multilayer body.

In a multilayer ceramic capacitor according to a preferred embodiment of the present invention, an exposed portion of the first base electrode layer is exposed from the first conductive resin layer at each of four corners of the ceramic multilayer body on the first end surface side of the ceramic multilayer body and is in direct contact with the first plating layer, and an exposed portion of the second base electrode layer is exposed from the second conductive resin layer at each of four corners of the ceramic multilayer body on the second end surface side of the ceramic multilayer body and is in direct contact with the second plating layer.

In a multilayer ceramic capacitor according to a preferred embodiment of the present invention, the exposed portion of the first base electrode layer is exposed from the first conductive resin layer at the four corners and four ridge-line portions of the ceramic multilayer body on the first end surface side of the ceramic multilayer body and is in direct contact with the first plating layer, and the exposed portion of the second base electrode layer is exposed from the second conductive resin layer at the four corners and four ridge-line portions of the ceramic multilayer body on the second end surface side of the ceramic multilayer body and is in direct contact with the second plating layer.

In a multilayer ceramic capacitor according to a preferred embodiment of the present invention, a first section where the exposed portion of the first base electrode layer is in direct contact with the first plating layer extends toward a center portion of the first end surface of the ceramic multilayer body, and a second section where the exposed portion of the second base electrode layer is in direct contact with the second plating layer extends toward a center portion of the second end surface of the ceramic multilayer body.

In a multilayer ceramic capacitor according to a preferred embodiment of the present invention, the first section where the exposed portion of the first base electrode layer is in direct contact with the first plating layer is not located in the center portion of the first end surface of the ceramic multilayer body, and the second section where the exposed portion of the second base electrode layer is in direct contact with the second plating layer is not located in the center portion of the second end surface of the ceramic multilayer body.

According to the preferred embodiments of the present invention, a conductive resin layer is disposed on a base electrode layer such that an exposed portion of the base electrode layer is exposed at least at one corner on an end surface side of a ceramic multilayer body, and the exposed portion of the base electrode layer is in direct contact with a plating layer at least at the one corner on the end surface side of the ceramic multilayer body, thus providing a multilayer ceramic capacitor that includes an outer electrode with significantly reduced equivalent series resistance (ESR).

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3A through FIG. 3D are views illustrating a ceramic multilayer body before providing a plating layer of an outer electrode, where FIG. 3A is a right side view, FIG. 3B is a left side view, FIG. 3C is a front view, and FIG. 3D is a plan view.

FIG. 6 is a right side view of a ceramic multilayer body before providing a plating layer of an outer electrode according to the preferred embodiment illustrated in FIG. 5.

DETAILED DESCRIPTION OF THE PREFERRED EMBODIMENTS

Figure 1:
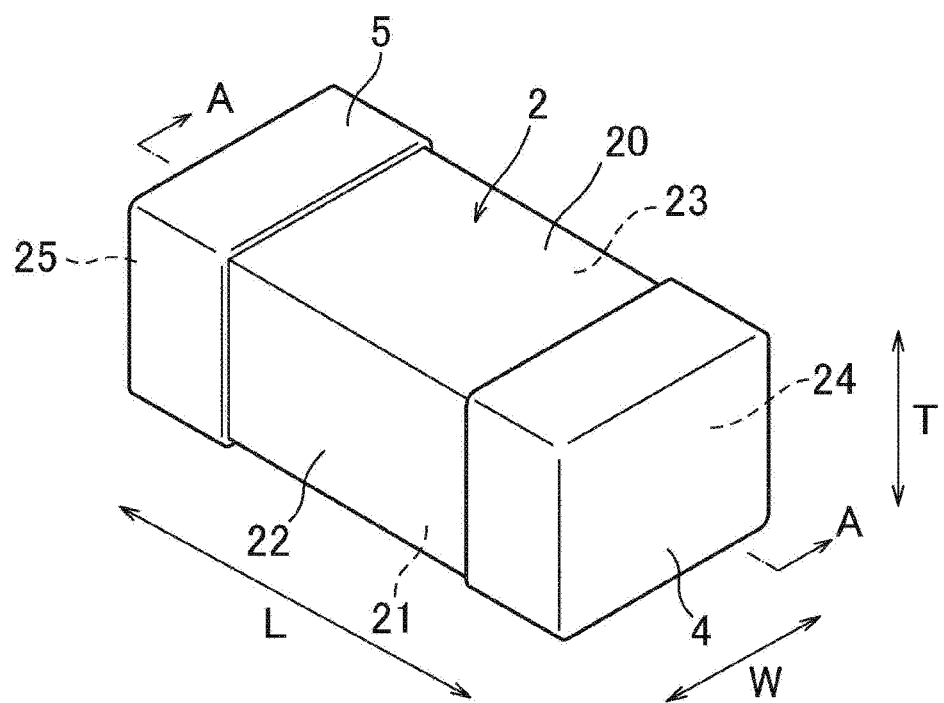
FIG. 1 is an exterior view illustrating a first preferred embodiment of a multilayer ceramic capacitor according to the present invention.
Figure 2:
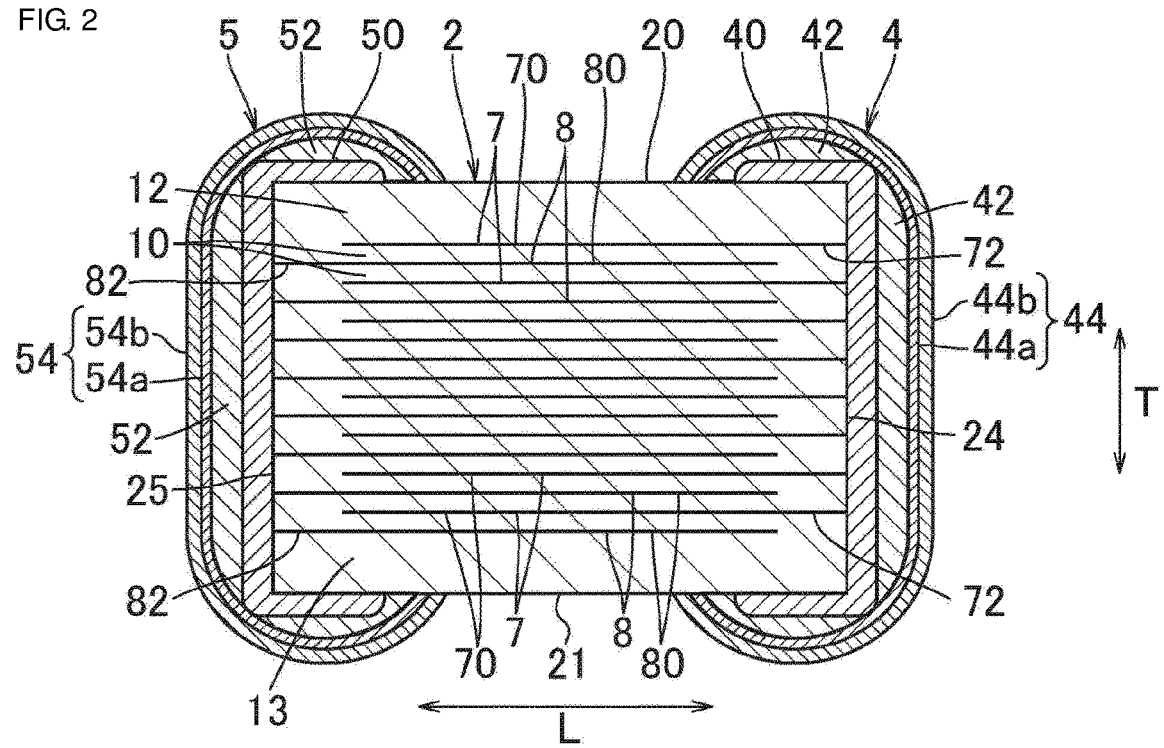
FIG. 2 is a cross-sectional view taken along an A-A line in FIG. 1.

Preferred embodiments of a multilayer ceramic capacitor according to the present invention will be described. FIG. 1 is an exterior view of a multilayer ceramic capacitor 1. FIG. 2 is a cross-sectional view taken along an A-A line in FIG. 1, and illustrates a cross section of the multilayer ceramic capacitor 1 extending in a lengthwise direction L and in a lamination direction T (hereinafter, referred to as an "LT cross section").

The multilayer ceramic capacitor 1 includes a ceramic multilayer body 2, a first outer electrode 4 disposed on a surface of one end portion of the ceramic multilayer body 2, and a second outer electrode 5 disposed on a surface of the other end portion of the ceramic multilayer body 2.

The ceramic multilayer body 2 is provided by laminating a plurality of ceramic dielectric layers 10 that are each provided with a corresponding first inner electrode 7 on a surface thereof, another plurality of ceramic dielectric layers that are each provided with a corresponding second inner electrode 8 on a surface thereof, a first outer-layer ceramic dielectric layer 12 provided with no inner electrodes, and a second outer-layer ceramic dielectric layer 13 provided with no inner electrodes. The ceramic multilayer body 2 preferably has a rectangular or substantially rectangular parallelepiped shape, and includes a first principal surface 20 and a second principal surface 21 opposing each other in the lamination direction T, a first side surface 22 and a second side surface 23 opposing each other in a width direction W perpendicular or substantially perpendicular to the lamination direction T, and a first end surface 24 and a second end surface 25 opposing each other in the lengthwise direction L perpendicular or substantially perpendicular to the lamination direction T and the width direction W.

It is preferable that corners and ridge-line portions of the ceramic multilayer body 2 are rounded or substantially rounded. Each corner is a portion at which three surfaces of the ceramic multilayer body 2 meet, while each ridge-line portion is a portion at which two surfaces of the ceramic multilayer body 2 meet. Further, uneven or substantially uneven portions or the like may be provided on a portion or all of the first principal surface 20 and the second principal surface 21, the first side surface 22 and the second side surface 23, and the first end surface 24 and the second end surface 25.

The ceramic dielectric layers of the ceramic multilayer body 2 include the plurality of ceramic dielectric layers 10 laminated in the lamination direction T of the ceramic multilayer body 2, and the first outer-layer ceramic dielectric layer 12 and the second outer-layer ceramic dielectric layer 13 that are provided on the upper side and lower side of the plurality of laminated ceramic dielectric layers 10, respectively, to sandwich the plurality of laminated ceramic dielectric layers 10 therebetween.

Each of the plurality ceramic dielectric layers 10, the first outer-layer ceramic dielectric layer 12, and the second outer-layer ceramic dielectric layer 13 include a dielectric ceramic including a primary component such as $BaTiO_3$, $CaTiO_3$, $SrTiO_3$, $CaZrO_3$, or the like. Further, the dielectric ceramic may include a secondary component such as a Mn compound, Fe compound, Cr compound, Co compound, Ni compound, or the like. It is preferable that a thickness of the plurality of ceramic dielectric layers 10, a thickness of the first outer-layer ceramic dielectric layer 12, and a thickness of the second outer-layer ceramic dielectric layer 13 are each no less than about 0.5 μm and no more than about 10 μm, for example.

The first inner electrodes 7 preferably have a rectangular or substantially rectangular shape, and each includes an opposing electrode portion 70 that opposes the second inner electrodes 8 and an extended electrode portion 72 that extends from the opposing electrode portion 70 to the first end surface 24 of the ceramic multilayer body 2. The second inner electrodes 8 are provided in a rectangular or substantially rectangular shape, and each includes an opposing electrode portion 80 that opposes the first inner electrodes 7 and an extended electrode portion 82 that extends from the opposing electrode portion 80 to the second end surface 25 of the ceramic multilayer body 2.

In the lengthwise direction L of the ceramic multilayer body 2, a gap is provided between the opposing electrode portion 70 and the second end surface 25 of the ceramic multilayer body 2, and a gap is provided between the opposing electrode portion 80 and the first end surface 24 of the ceramic multilayer body 2. Further, the opposing electrode portions 70 and the opposing electrode portions 80 oppose each other, sandwiching the plurality of ceramic dielectric layers 10 therebetween thus to provide electrostatic capacitance.

Further, in the width direction W of the ceramic multilayer body 2, a gap is provided between one end portion of the first inner electrodes 7 and the first side surface 22 of the ceramic multilayer body 2, and a gap is provided between the other end portion of the first inner electrodes 7 and the second side surface 23 of the ceramic multilayer body 2. A gap is provided between one end portion of the second inner electrodes 8 and the first side surface 22 of the ceramic multilayer body 2, and a gap is provided between the other end portion of the second inner electrodes 8 and the second side surface 23 of the ceramic multilayer body 2.

Each of the first inner electrodes 7 and the second inner electrodes 8 includes at least one conductive material selected from a group including Ni, Cu, Ag, Pd, Ag—Pd alloy, Au, and the like, for example. It is preferable that the thicknesses of each of the first inner electrodes 7 and each of the second inner electrodes 8 is no less than about 0.2 μm and no more than about 2.0 μm, for example.

The first outer electrode 4 is provided on a surface of the first end surface 24 of the ceramic multilayer body 2, and end portions thereof extend to the first principal surface 20, the second principal surface 21, the first side surface 22, and the second side surface 23 of the ceramic multilayer body 2. The second outer electrode 5 is provided on a surface of the second end surface 25 of the ceramic multilayer body 2, and end portions thereof extend to the first principal surface 20, the second principal surface 21, the first side surface 22, and the second side surface 23 of the ceramic multilayer body 2. The first outer electrode 4 is connected to an end surface of the extended electrode portions 72 of the inner electrodes 7 exposed on the first end surface 24 of the ceramic multilayer body 2. The second outer electrode 5 is connected to an end surface of the extended electrode portions 82 of the inner electrodes 8 exposed on the second end surface 25 of the ceramic multilayer body 2.

The first outer electrode 4 includes a first base electrode layer 40 disposed on a surface of the ceramic multilayer body 2, a first conductive resin layer 42 that covers the first base electrode layer 40, and a first plating layer 44 that covers the first conductive resin layer 42. The second outer electrode 5 includes a second base electrode layer 50 disposed on the surface of the ceramic multilayer body 2, a second conductive resin layer 52 that covers the second base electrode layer 50, and a second plating layer 54 that covers the second conductive resin layer 52.

It is preferable that the first base electrode layer is provided on the first end surface 24 of the ceramic multilayer body 2, with end portions thereof extending to the first principal surface 20, the second principal surface 21, the first side surface 22, and the second side surface 23 of the ceramic multilayer body 2. However, the first base electrode layer 40 may be provided only on the first end surface 24 of the ceramic multilayer body 2. It is preferable that the second base electrode layer 50 be provided on the second end surface 25 of the ceramic multilayer body 2, with end portions thereof extending to the first principal surface 20, the second principal surface 21, the first side surface 22, and the second side surface 23 of the ceramic multilayer body 2. However, the second base electrode layer 50 may be provided only on the second end surface 25 of the ceramic multilayer body 2.

The first base electrode layer 40 includes a conductive metal and a glass component, and the second base electrode 50 includes a conductive metal and a glass component. The conductive metal includes, for example, at least one of Cu, Ni, Ag, Pd, Ag—Pd alloy, Au, or the like, and the glass component includes, for example, glass including at least one of B, Si, Ba, Mg, Al, Li, or the like. The first base electrode layer 40 and the second base electrode layer 50 each include a conductive paste including a conductive metal and a glass component that is applied and baked onto the end portions of the ceramic multilayer body 2. The first base electrode layer 40, the second base electrode layer 50, and the ceramic multilayer body 2 may be fired at the same time, or the first base electrode layer 40 and the second base electrode layer 50 may be baked after the sintering of the ceramic multilayer body 2. It is preferable that the thickness of each of the first base electrode layer 40 and the second base electrode layer 50 is no less than about 10 μm and no more than about 50 μm at a portion including the largest thickness, for example.

The first conductive resin layer 42 is provided on the first end surface 24 side of the ceramic multilayer body 2, and the second conductive resin layer 52 is provided on the second end surface 25 side of the ceramic multilayer body 2.

As shown in FIG. 3A through FIG. 3D, the first conductive resin layer 42 is disposed on the first base electrode layer 40 such that an exposed portion of the first base electrode layer 40 is exposed at least at one of four corners 24a, 24b, 24c, and 24d on the first end surface 24 side of the ceramic multilayer body 2. More specifically, the first conductive resin layer 42 covers all of the first base electrode layer 40, including the end portions of the first base electrode layer 40 disposed on the first principal surface 20, the second principal surface 21, the first side surface 22, and the second side surface 23, except for the exposed portion on at least one corner of the first base electrode layer 40 that is positioned on the first end surface 24.

The second conductive resin layer 52 is disposed on the second base electrode layer 50 such that an exposed portion of the second base electrode layer 50 is exposed at least at one of four corners 25a, 25b, 25c, and 25d on the second end surface side of the ceramic multilayer body 2. More specifically, the second conductive resin layer 52 covers all of the second base electrode layer 50, including the end portions of the second base electrode layer 50 disposed on the first principal surface 20, the second principal surface 21, the first side surface 22, and the second side surface 23, except for the exposed portion on at least the one corner of the second base electrode layer 50that is positioned on the second end surface 25.

As such, the first outer electrode 4 is disposed such that the first plating layer 44 is in direct contact with an upper portion of the first base electrode layer 40 at least at the one of the four corners 24a, 24b, 24c, and 24d on the first end surface 24 side of the ceramic multilayer body 2 without disposing the first conductive resin layer 42 including high resistivity therebetween. The second outer electrode 5 is provided such that the second plating layer 54 is in direct contact with an upper portion of the second base electrode layer at least at the one of the four corners on the second end surface 25 side without disposing the second conductive resin layer 52 including high resistivity therebetween. Thus, the first outer electrode 4 and the second outer electrode 5 include equivalent series resistance (ESR) that is significantly reduced.

It is preferable that the first conductive resin layer 42 is disposed on the first end surface 24 side of the ceramic multilayer body 2 to completely cover the first base electrode layer 40 disposed under the first conductive resin layer 42, and the second conductive resin layer 52 is disposed on the second end surface 25 side of the ceramic multilayer body 2 to completely cover the second base electrode layer 50 disposed under the second conductive resin layer 52.

Further, it is preferable that the first conductive resin layer 42 is disposed on the first base electrode layer 40 such that the exposed portion of the first base electrode layer 40 is exposed at all of the four corners 24a, 24b, 24c, and 24d on the first end surface 24 side of the ceramic multilayer body 2. It is preferable that the second conductive resin layer 52 is disposed on the second base electrode layer 50 such that the exposed portion of the second base electrode layer 50 is exposed at all of the four corners 25a, 25b, 25c, and 25d on the second end surface 25 side of the ceramic multilayer body 2.

In this configuration, the first outer electrode 4 is provided such that the first plating layer 44 is in direct contact with the upper portion of the first base electrode layer at all of the four corners 24a, 24b, 24c, and 24d on the first end surface 24 side of the ceramic multilayer body 2 without interposing the first conductive resin layer 42 including high resistivity therebetween. The second outer electrode 5 is provided such that the second plating layer 54 is in direct contact with the upper portion of the second base electrode layer 50 at all of the four corners 25a, 25b, 25c, and 25d on the second end surface 25 side without disposing the second conductive resin layer 52 including high resistivity therebetween. Thus, the first outer electrode 4 and the second outer electrode 5 include equivalent series resistance (ESR) that is significantly reduced.

Figure 4:
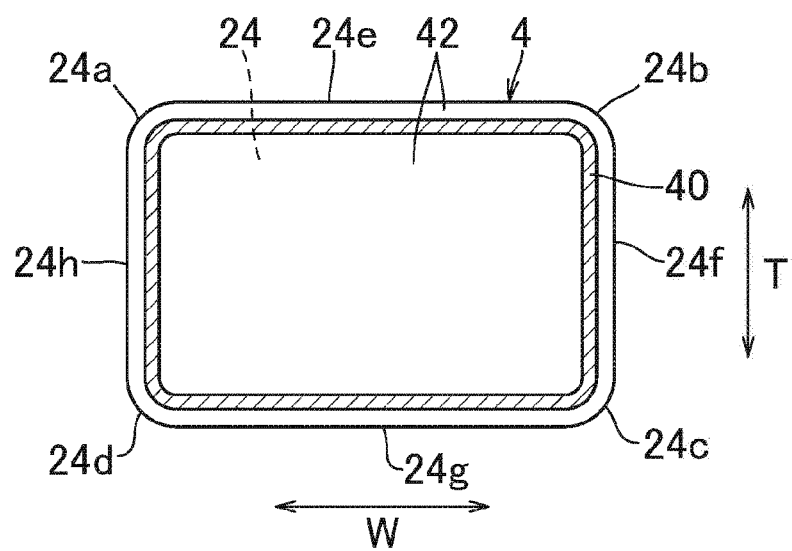
FIG. 4 is a right side view of a ceramic multilayer body before providing a plating layer of an outer electrode according to another preferred embodiment of the present invention.

Furthermore, as shown in FIG. 4, it is preferable that the first conductive resin layer 42 is disposed on the first base electrode layer 40 such that the exposed portion of the first base electrode layer 40 is exposed in a ring-shaped or substantially ring-shaped pattern at all of the four corners 24a, 24b, 24c and 24d, and at all of four ridge-line portions 24e, 24f, 24g and 24h on the first end surface 24 side of the ceramic multilayer body 2. It is preferable that the second conductive resin layer 52 is disposed on the second base electrode layer 50 such that the exposed portion of the second base electrode layer is exposed in a ring-shaped or substantially ring-shaped pattern at all of the four corners 25a, 25b, 25c and 25d, and at all of four ridge-line portions 25e, 25f, 25g and 25h on the second end surface 25 side of the ceramic multilayer body 2.

In this configuration, the first outer electrode 4 is provided such that the first plating layer 44 to be explained later in detail is in direct contact with the upper portion of the first base electrode layer 40 at all of the four corners 24a, 24b, 24c and 24d, and at all of the four ridge-line portions 24e, 24f, 24g and 24h on the first end surface 24 side without disposing the first conductive resin layer 42 including high resistivity therebetween. The second outer electrode 5 is provided such that the second plating layer 54 to be explained later in detail is in direct contact with the upper portion of the second base electrode layer 50 at all of the four corners 25a, 25b, 25c and 25d, and at all of the four ridge-line portions 25e, 25f, 25g and 25h on the second end surface 25 side without disposing the second conductive resin layer 52 including high resistivity therebetween. Thus, the first outer electrode and the second outer electrode 5 include equivalent series resistance (ESR) that is significantly reduced.

Figure 5:
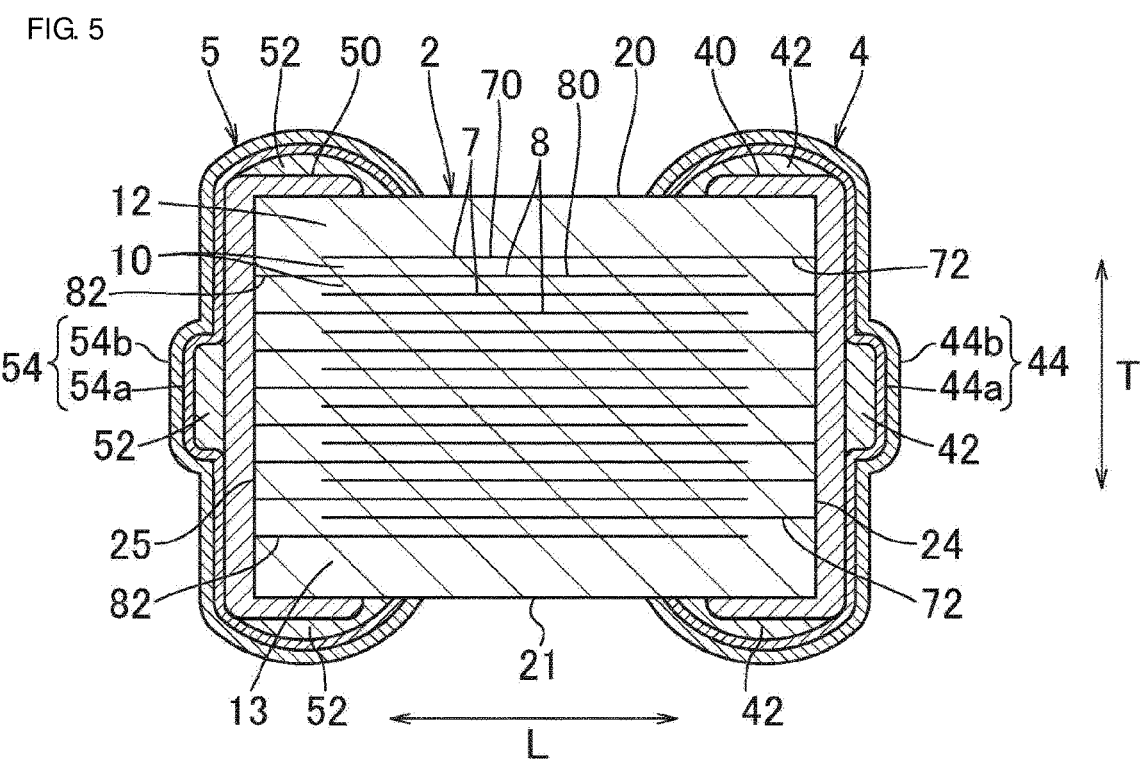
FIG. 5 is an LT cross-sectional view according to still another preferred embodiment of the present invention.

As shown in FIGS. 5 and 6, a section where the exposed portion of the first base electrode layer 40 is in direct contact with the first plating layer 44 extends toward a center portion of the first end surface 24 of the ceramic multilayer body 2, and a section where the exposed portion of the second base electrode layer 50 is in direct contact with the second plating layer 54 extends toward a center portion of the second end surface 25 of the ceramic multilayer body 2. In this configuration, the section where the exposed portion of the first base electrode layer 40 is in direct contact with the first plating layer 44 and the section where the exposed portion of the second base electrode layer 50 is in direct contact with the second plating layer 54 extend over a substantial portion of the first and second end surfaces 24 and 25. Thus, the first outer electrode 4 and the second outer electrode 5 include equivalent series resistance (ESR) that is significantly reduced.

Further, the section where the exposed portion of the first base electrode layer 40 is in direct contact with the first plating layer 44 extends toward the center portion of the first principal surface 20 and to the center portion of the second principal surface 21 of the ceramic multilayer body 2. The section where the exposed portion of the second base electrode layer 50 is in direct contact with the second plating layer 54 extends toward the center portion of the first principal surface 20 and to the center portion of the second principal surface 21 of the ceramic multilayer body 2. In this configuration, the section where the exposed portion of the first base electrode layer 40 is in direct contact with the first plating layer 44 and the section where the exposed portion of the second base electrode layer 50 is in direct contact with the second plating layer 54 extend over a substantial portion of the first and second end surfaces 24 and 25. Thus, the first outer electrode 4 and the second outer electrode 5 include equivalent series resistance (ESR) that is significantly reduced.

It is preferable that the first base electrode layer 40 is not in direct contact with the first plating layer 44 in the center portion of the first end surface 24 of the ceramic multilayer body 2. It is preferable that the second base electrode layer 50 is not in direct contact with the second plating layer 54 in the center portion of the second end surface of the ceramic multilayer body 2. Thus, it is preferable that the first conductive resin layer 42 is provided in the center portion of the first end surface 24 of the ceramic multilayer body 2, and that the second conductive resin layer 52 is provided in the center portion of the second end surface 25 of the ceramic multilayer body 2. In this configuration, the generation of cracks in the ceramic multilayer body 2 is significantly reduced or prevented.

In order to realize a structure in which the first conductive resin layer 42 is disposed such that the exposed portion of the first base electrode layer 40 is exposed at the four corner 24a, 24b, 24c and 24d and at the four ridge-line portions 24e, 24f, 24g and 24h on the first end surface 24 side of the ceramic multilayer body 2, the following method may be used, for example.

After the formation of the first conductive resin layer 42, the ceramic multilayer body 2 is barrel polished to remove the first conductive resin layer 42 at the corners 24a, 24b, 24c and 24d and at the four ridge-line portions 24e, 24f, 24g and 24h. Alternatively, after the formation of the first conductive resin layer 42, the first conductive resin layer 42 is polished and removed at the corners 24a, 24b, 24c and 24d and the four ridge-line portions 24e, 24f, 24g and 24h in an initial stage of a plating process by using a rotating barrel polishing method during the plating process in which an impact of collision with conductive media is applied to the first conductive resin layer 42 by increasing the number of barrel rotations or the like.

In an LT cross section of the first outer electrode 4, it is preferable that a ratio of a length of the section where the first plating layer 44 is in direct contact with the exposed portion of the first base electrode layer 40 to a length of the surface of the first base electrode layer 40 is equal to, substantially equal to, or more than about 20%, for example. In an LT cross section of the second outer electrode 5, it is preferable that a ratio of a length of the section where the second plating layer 54 is in direct contact with the second base electrode layer 50 to a length of the surface of the second base electrode layer 50 be equal to, substantially equal to, or more than about 20%, for example. This makes it possible to effectively achieve the advantageous effects of preferred embodiments of the present invention.

A measurement method therefor is as follows. First, to obtain a cross section, a polishing operation is performed on the ceramic multilayer body 2 until an LT surface positioned at about half the width of the ceramic multilayer body 2 is exposed. Then, in this LT cross section, a total length of the surface of the first base electrode layer 40 and the length of the section where the exposed portion of the first base electrode layer 40 is in direct contact with the first plating layer 44 are measured. Thereafter, the ratio of the length of the section where the first plating layer 44 is in direct contact with the exposed portion of the first base electrode layer 40 to the total length of the surface of the first base electrode layer 40 is calculated. Further, in the LT cross section, a total length of the surface of the second base electrode layer 50 and the length of the section where the exposed portion of the second base electrode layer 50 is in direct contact with the second plating layer 54 are measured. Thereafter, the ratio of the length of the section where the exposed portion of the second plating layer 54 is in direct contact with the second base electrode layer 50 to the total length of the surface of the second base electrode layer 50 is calculated.

It is preferable that a thickness of the first conductive resin layer 42 is no less than about 3 μm and no more than about 20 μm in a position at about half the length, in a direction connecting the first end surface 24 and the second end surface 25 (the lengthwise direction L), of the first base electrode layer 40 that is positioned on the first principal surface 20 or the second principal surface 21 of the ceramic multilayer body 2, and it is preferable that the thickness thereof is no less than about 20 μm and no more than about 100 μm in a position at about half the length, in a direction connecting the first principal surface 20 and the second principal surface 21 (the lamination direction T), of the first base electrode layer 40 that is positioned on the first end surface 24 of the ceramic multilayer body 2, for example. It is preferable that a thickness of the second conductive resin layer 52 is no less than about 3 μm and no more than about 20 μm in a position at about half the length, in a direction connecting the first end surface 24 and the second end surface 25 (the lengthwise direction L), of the second base electrode layer 50 that is positioned on the first principal surface 20 or the second principal surface 21 of the ceramic multilayer body 2, and it is preferable that the thickness thereof is no less than about 20 μm and no more than about 100 μm in a position at about half the length, in a direction connecting the first principal surface 20 and the second principal surface 21 (the lamination direction T), of the second base electrode layer 50 that is positioned on the second end surface 25 of the ceramic multilayer body 2, for example.

The first conductive resin layer 42 includes a thermosetting resin and a metal component. As a result, the first conductive resin layer 42 is more flexible than the first plating layer 44 and the first base electrode layer 40 including a fired conductive paste, for example. The second conductive resin layer 52 includes a thermosetting resin and a metal component. As a result, the second conductive resin layer 52 is more flexible than the second plating layer 54 and the second base electrode layer 50 including a fired conductive paste, for example. In this configuration, when an impact caused by a physical impact, a heat cycle, or the like is applied to the ceramic multilayer body 2, the first conductive resin layer 42 and the second conductive resin layer 52 define and function as a shock-absorbing layer, thus substantially reducing the generation of cracks in the ceramic multilayer body 2.

The metal component included in the first conductive resin layer 42 and the second conductive resin layer 52 is at least one of Ag, Cu, an alloy of these metals, and metal powder including a surface coated with Ag. When the metal powder including the surface coated with Ag is used, it is preferable that Cu or Ni is used as the metal powder. Further, oxidation resistant processed Cu may be used as well. Using Ag conductive metal powder as the metal component is preferable for the following reasons: Ag is suitable for an electrode material because Ag includes a lower specific resistance than any other metal, Ag does not oxidize, and Ag includes high corrosion resistance as a result of being a noble metal. Using the metal powder coated with Ag as the metal component is preferable because the cost of the metal powder of the parent material is significantly reduced and the above-mentioned properties of Ag are substantially maintained.

The shape of the metal component included in the first conductive resin layer 42 and the second conductive resin layer 52 is not limited to any specific shape, and a conductive filler may be formed, for example, in a spherical or substantially spherical shape, a flat or substantially flat shape, or a shape in which a spherical or substantially spherical shape and a flat or substantially flat shape are mixed. An average particle diameter of the metal component is not limited to any specific diameter, and the average particle diameter of the conductive filler is no less than about 0.3 µm and no more than about 10 µm, for example. The metal component mainly contributes to electric conduction of the first conductive resin layer 42 and the second conductive resin layer 52. To be specific, the conductive fillers make contact with one another to provide conductive paths inside the first conductive resin layer 42 and the second conductive resin layer 52.

The first conductive resin layer 42 and the second conductive resin layer 52 include at least one of various types of known thermosetting resins, such as an epoxy resin, phenol resin, urethane resin, silicone resin, polyimide resin, and so on. In particular, an epoxy-based resin excellent in heat resistance, moisture resistance, close-contact properties, and the like is preferably used. It is preferable that the first conductive resin layer 42 and the second conductive resin layer include a curing agent and a thermosetting resin. When an epoxy resin is used as a base resin, various types of known compounds such as a phenol-based compound, amine-based compound, acid anhydride-based compound, imidazole-based compound, and so on may be used as a curing agent of the epoxy resin.

The first plating layer 44 is disposed on the first end surface 24 side of the ceramic multilayer body 2, and the second plating layer 54 is disposed on the second end surface 25 side of the ceramic multilayer body 2.

The first plating layer 44 is disposed on the first conductive resin layer 42, and the exposed portion of the first base electrode layer 40 that is exposed from the first conductive resin layer 42 at least at the one of the four corners 24a, 24b, 24c, and 24d in the first end surface 24 of the ceramic multilayer body 2. Accordingly, the exposed portion of the first base electrode layer 40 is in direct contact with the first plating layer 44 at least at the one of the four corners 24a, 24b, 24c, and 24d in the first end surface 24 of the ceramic multilayer body 2. More specifically, the first plating layer 44 is disposed on the first conductive resin layer positioned on the first end surface 24 of the ceramic multilayer body 2, at least at the one corner of the first base electrode layer 40, and the first base electrode layer 40 positioned on the first and second principal surfaces 20, 21 and the first and second side surfaces 22, 23 of the ceramic multilayer body 2.

The second plating layer 54 is disposed on the second conductive resin layer 52, and the exposed portion of the second base electrode layer 50 that is exposed from the second conductive resin layer 52 at least at the one of the four corners 25a, 25b, 25c, and 25d in the second end surface 25 of the ceramic multilayer body 2. Accordingly, the exposed portion of the second base electrode layer 50 is in direct contact with the second plating layer 54 at least at the one of the four corners 25a, 25b, 25c, and 25d in the second end surface 25 of the ceramic multilayer body 2. More specifically, the second plating layer 54 is disposed on the second conductive resin layer 52 positioned on the second end surface 25 of the ceramic multilayer body 2, at least the one corner of the second base electrode layer 50, and the second base electrode layer 50 positioned on the first and second principal surfaces 20, 21 and the first and second side surfaces 22, 23 of the ceramic multilayer body 2.

As a result, the first outer electrode 4 is provided such that the first plating layer 44 is in direct contact with the upper portion of the first base electrode layer 40 at least at the one of the four corners 24a, 24b, 24c, and 24d on the first end surface 24 side of the ceramic multilayer body 2 without disposing the first conductive resin layer 42 including high resistivity therebetween. The second outer electrode 5 is provided such that the second plating layer 54 is in direct contact with the upper portion of the second base electrode layer 50 at least at the one of the four corners 25a, 25b, 25c, and 25d on the second end surface 25 side without disposing the second conductive resin layer 52 including high resistivity therebetween. Thus, the first outer electrode 4 and the second outer electrode 5 include equivalent series resistance (ESR) that is substantially reduced.

It is preferable that the first plating layer 44 is disposed to completely cover the first conductive resin layer 42 positioned under the first plating layer 44, and the second plating layer 54 is disposed to completely cover the second conductive resin layer 52 positioned under the second plating layer 54.

It is preferable that the first plating layer 44 is in direct contact with the exposed portion of the first base electrode layer 40 exposed from the first conductive resin layer at all of the four corners 24a, 24b, 24c, and 24d on the first end surface 24 side of the ceramic multilayer body 2. It is preferable that the second plating layer 54 is in direct contact with the exposed portion of the second base electrode layer 50 exposed from the second conductive resin layer 52 at all of the four corners 25a, 25b, 25c, and 25d on the second end surface 25 side of the ceramic multilayer body 2. Thus, the first outer electrode 4 and the second outer electrode 5 include equivalent series resistance (ESR) that is significantly reduced.

It is preferable that the first plating layer 44 is in direct contact with the exposed portion of the first base electrode layer 40 exposed in a ring-shaped or substantially ring-shaped pattern from the first conductive resin layer 42 at all of the four corners 24a, 24b, 24c and 24d and at all of the four ridge-line portions 24e, 24f, 24g and 24h on the first end surface 24 side of the ceramic multilayer body 2. It is preferable that the second plating layer 54 is in direct contact with the exposed portion of the second base electrode layer 50 exposed in a ring-shaped or substantially ring-shaped configuration from the second conductive resin layer 52 at all of the four corners 25a, 25b, 25c and 25d and at all of the four ridge-line portions 25e, 25f, 25g and 25h on the second end surface 25 side of the ceramic multilayer body 2. Thus, the first outer electrode 4 and the second outer electrode 5 include equivalent series resistance (ESR) that is significantly reduced.

The first plating layer 44 and the second plating layer 54 include at least one material selected from a group including Cu, Ni, Ag, Pd, Ag—Pd alloy, Au, and the like, for example. Each of the first plating layer 44 and the second plating layer 54 may include a plurality of layers. It is preferable for the first plating layer 44 to include a two-layer structure of a Ni plating layer 44a and a Sn plating layer 44b. It is preferable for the second plating layer 54 to include a two-layer structure of a Ni plating layer 54a and a Sn plating layer 54b. The Ni plating layer 44a significantly reduces the erosion of the first base electrode layer 40 by using solder to mount the multilayer ceramic capacitor 1, and the Ni plating layer 54a significantly reduces the erosion of the second base electrode layer 50 by using solder to mount the multilayer ceramic capacitor 1. The Sn plating layer 44b and the Sn plating layer 54b significantly increase wettability of the solder when mounting the multilayer ceramic capacitor 1, thus significantly increasing ease of mounting the multilayer ceramic capacitor 1. It is preferable that a thickness of each plating layer is no less than about 1 μm and no more than about 15 μm, for example.

Next, a preferred embodiment of a manufacturing method for a multilayer ceramic capacitor according to the present invention will be described. Hereinafter, the description will be given as an example in which the multilayer ceramic capacitors 1 are mass-produced. During mass-production, the multilayer ceramic capacitors are manufactured in the form of a mother ceramic multilayer body that includes a plurality of ceramic multilayer bodies 2.

A ceramic paste including the ceramic dielectric powder of the inter-layer ceramic dielectric layer 10 is applied in sheet form by a screen printing method or the like, for example, and is then dried thus to provide a mother ceramic dielectric green sheet. A ceramic paste including the ceramic dielectric powder of the first outer-layer ceramic dielectric layer 12 is applied in sheet form by the screen printing method or the like, for example, and is then dried thus to provide a first outer-layer mother ceramic dielectric green sheet. A ceramic paste including the ceramic dielectric powder of the second outer-layer ceramic dielectric layer 13 is applied in sheet form by the screen printing method or the like, for example, and is then dried thus to provide a second outer-layer mother ceramic dielectric green sheet.

An inner electrode conductive paste is applied to a surface of the mother ceramic dielectric green sheet by the screen printing method or the like thus to form the predetermined first inner electrode 7 and second inner electrode 8. A known binder, solvent, or the like is included in the ceramic paste, the inner electrode conductive paste, and the like.

A plurality of mother ceramic dielectric green sheets that each include one of the first inner electrodes 7 formed on a surface thereof and another plurality of mother ceramic dielectric green sheets that each include one of the second inner electrodes 8 formed on a surface thereof, are alternately laminated. In addition, a plurality of first outer-layer mother ceramic dielectric green sheets and a plurality of second outer-layer mother ceramic dielectric green sheets are respectively laminated on and under the plurality of laminated mother ceramic dielectric green sheets to sandwich the plurality of laminated mother ceramic dielectric green sheets therebetween. The multilayer body is pressure-bonded with an isostatic press or the like to provide a mother ceramic multilayer body.

The mother ceramic multilayer body is cut into pieces with predetermined shape dimensions to provide a plurality of raw ceramic multilayer bodies 2. At this time, barrel polishing may be performed on the raw ceramic multilayer bodies 2 to round corners, ridge-line portions, and the like thereof.

Next, the raw ceramic multilayer bodies 2 are sintered. Thus, the ceramic multilayer body 2 including the first inner electrode 7 and the second inner electrode 8 therein is provided. The extended electrode portions 72 of the first inner electrodes are extended to the first end surface 24 of the ceramic multilayer body 2, and the extended electrode portions 82 of the second inner electrodes 8 are extended to the second end surface 25 of the ceramic multilayer body 2. A sintering temperature of the raw ceramic multilayer body 2 is appropriately set in accordance with the ceramic material, the conductive material, and so on used in the raw ceramic multilayer body 2. The sintering temperature of the raw ceramic multilayer body 2 preferably is set to be no less than about 900° C. and no more than about 1,300° C., for example.

Next, the first base electrode layer 40 of the first outer electrode 4 is formed by a conductive paste that is applied and baked on the first end surface 24 of the ceramic multilayer body 2, and the second base electrode layer 50 of the second outer electrode 5 is formed by the conductive paste that is applied and baked on the second end surface 25 of the ceramic multilayer body 2. It is preferable that the baking temperature is no less than about 700° C. and no more than about 900° C., for example.

Subsequently, a conductive resin paste including a thermosetting resin and a metal component is applied to cover the first base electrode layer 40, and thereafter the thermosetting resin is thermally cured through a heating process at no less than about 250° C. and no more than about 550° C., for example, thus to form the first conductive resin layer 42. Likewise, the conductive resin paste including a thermosetting resin and a metal component is applied to cover the second base electrode layer 50, and thereafter the thermosetting resin is thermally cured through the heating process at no less than about 250° C. and no more than about 550° C., for example, thus to form the second conductive resin layer 52. At this time, it is preferable that the heating process is carried out under an $N_2$ atmosphere. It is preferable to suppress oxygen concentration to be no more than about 100 ppm, for example, to significantly reduce or prevent dispersion of the thermosetting resin and significantly reduce or prevent various types of metal components from being oxidized.

After the formation of the first conductive resin layer 42, barrel polishing is performed to remove the first conductive resin layer 42 at the four corners 24a, 24b, 24c and 24d, and/or at the four ridge-line portions 24e, 24f, 24g and 24h; after the formation of the second conductive resin layer 52, barrel polishing is carried out to remove the second conductive resin layer 52 at the four corners 25a, 25b, 25c and 25d, and/or at the four ridge-line portions 25e, 25f, 25g and 25h. Alternatively, by using a rotating barrel and increasing the number of barrel rotations or the like during the initial stage of the plating process and after the formation of the first conductive resin layer 42 and the second conductive resin layer 52, the ceramic multilayer body 2 is collided with conductive media to polish and remove the first conductive resin layer 42 from the corners 24a, 24b, 24c and 24d and the ridge-line portions 24e, 24f, 24g and 24h, and/or the second conductive resin layer 52 from the corners 25a, 25b, 25c and 25d and the ridge-line portions 25e, 25f, 25g and 25h.

Next, the first plating layer 44 is formed on the first conductive resin layer 42, and the second plating layer 54 is formed on the second conductive resin layer 52. The first plating layer 44 and the second plating layer 54 are each formed of a plurality of layers as needed.

It is to be noted that the present invention is not limited to the aforementioned preferred embodiments, and variations thereof may be made without departing from the scope and spirit of the present invention.

EXPERIMENTAL EXAMPLES

Multilayer ceramic capacitors were manufactured using the above-discussed manufacturing method based on the following specifications.

(1) Working Example 1

Dimensions of Multilayer Ceramic Capacitor 1 (Design Dimensions): L×W×T=about 1.6 mm×0.8 mm×0.8 mm Ceramic Dielectric Material: $BaTiO_3$ Electrostatic Capacitance (Design Value): about 0.1 µF Rated Voltage (Design Value): about 50 V Structures of First Outer Electrode 4 and Second Outer Electrode 5

First Base Electrode Layer 40 and Second Base Electrode Layer 50: electrodes that each include a conductive metal (Cu) and a glass component, and a thickness of about 50 µm at the center and about 5 µm at an edge portion.

First Conductive Resin Layer 42 and Second Conductive Resin Layer 52: a metal filler was Ag, the resin was an epoxy-based thermosetting resin and the thermal curing temperature was about 200° C.; a thickness was about 50 µm at the center and about 0 µm at an edge portion; the first conductive resin layer 42 was provided such that the first base electrode layer 40 was exposed at the four corners 24a, 24b, 24c, and 24d on the first end surface 24 side of the ceramic multilayer body 2; the second conductive resin layer 52 was provided such that the second base electrode layer 50 was exposed at the four corners 25a, 25b, 25c, and 25d on the second end surface 25 side of the ceramic multilayer body 2; and the number of barrel rotations was about 20 rpm.

First Plating Layer 44 and Second Plating Layer 54: two-layer structures each including a Ni plating layer of about 3 µm in thickness and a Sn plating layer of about 3 µm in thickness.

(2) Working Example 2

The first conductive resin layer 42 was provided such that the first base electrode layer 40 was exposed in a ring-shaped or substantially ring-shaped configuration at the four corners 24a, 24b, 24c and 24d and at the four ridge-line portions 24e, 24f, 24g and 24h on the first end surface 24 side of the ceramic multilayer body 2. The second conductive resin layer 52 was provided such that the second base electrode layer was exposed in a ring-shaped or substantially ring-shaped configuration at the four corners 25a, 25b, 25c and 25d and at the four ridge-line portions 25e, 25f, 25g and 25h on the second end surface 25 side of the ceramic multilayer body 2.

A multilayer ceramic capacitor including substantially the same structure as the multilayer ceramic capacitor of Working Example 1 was manufactured, except that the first and second conductive resin layers were provided such that the first base electrode layer and the second base electrode layer were exposed in a ring-shaped or substantially ring-shaped configuration. The number of barrel rotations was about 30 rpm.

(3) Comparative Example 1

A multilayer ceramic capacitor not including the first conductive resin layer 42 and the second conductive resin layer 52 was manufactured. Specifically, the first plating layer 44 was formed directly on the first base electrode layer 40, and the second plating layer 54 was formed directly on the second base electrode layer 50. The multilayer ceramic capacitor was manufactured under the same conditions as Working Example 1, except that the first conductive resin layer 42 and the second conductive resin layer 52 were not provided.

(4) Comparative Example 2

A multilayer ceramic capacitor in which the first conductive resin layer 42 was provided to cover the entirety of the first base electrode layer 40 such that the first base electrode layer 40 was not exposed at any of the four corners 24a, 24b, 24c and 24d on the first end surface 24 side of the ceramic multilayer body 2, and the second conductive resin layer was provided to cover the entirety of the second base electrode layer 50 such that the second base electrode layer 50 was not exposed at any of the four corners 25a, 25b, 25c, and 25d on the second end surface 25 side of the ceramic multilayer body 2. The multilayer ceramic capacitor was manufactured under substantially the same conditions as Working Example 1, except that the first conductive resin layer 42 and the second conductive resin layer 52 were provided to cover the entirety of the first base electrode layer 40 and the entirety of the second base electrode layer 50, respectively.

Evaluation Method

Each equivalent series resistance (ESR) of the manufactured multilayer ceramic capacitors was measured. The equivalent series resistance was measured using a PRECISION LCR METER (E4980A: made by Agilent Technologies), under the conditions where the measurement frequency was about 1 MHz and the measurement voltage was about 500 mV.

Evaluation Result

As shown in Table 1, when the first conductive resin layer 42 is provided on the first base electrode layer 40 such that the exposed portion of the first base electrode layer 40 is exposed at least at one of the four corners 24a, 24b, 24c, and 24d on the first end surface 24 side of the ceramic multilayer body 2, and the first plating layer 44 is in direct contact with the exposed portion of the first base electrode layer 40, the first plating layer 44 is provided in a corner of the first outer electrode 4 without disposing the first conductive resin layer 42 including high resistivity therebetween.

Further, when the second conductive resin layer 52 is provided on the second base electrode layer 50 such that the exposed portion of the second base electrode layer 50 is exposed at least at one of the four corners 25a, 25b, 25c, and 25d on the second end surface 25 side of the ceramic multilayer body 2, and the second plating layer 54 is in direct contact with the exposed portion of the second base electrode layer 50, the second plating layer 54 is provided in a corner of the second outer electrode 5 without disposing the second conductive resin layer 52 including high resistivity therebetween. Accordingly, the first outer electrode 4 and the second outer electrode 5 include equivalent series resistance (ESR) that is significantly reduced in comparison with the existing multilayer ceramic capacitors.

In particular, when the first conductive resin layer 42 is provided such that the exposed portion of the first base electrode layer 40 is exposed in a ring-shaped or substantially ring-shaped configuration from the first conductive resin layer 42 and is in direct contact with the first plating layer 44 at the four corners 24a, 24b, 24c and 24d and at the four ridge-line portions 24e, 24f, 24g and 24h on the first end surface 24 side of the ceramic multilayer body 2, and the second conductive resin layer 52 is provided such that the exposed portion of the second base electrode layer 50 is exposed in a ring-shaped or substantially ring-shaped configuration from the second conductive resin layer 52 and is in direct contact with the second plating layer 54 at the four corners 25a, 25b, 25c and 25d and at the four ridge-line portions 25e, 25f, 25g and 25h on the second end surface 25 side of the ceramic multilayer body 2, it is understood that the equivalent series resistance is significantly reduced such that the equivalent series resistance is equal to or substantially equal to the equivalent series resistance of the multilayer ceramic capacitor that does not include the first conductive resin layer 42 and the second conductive resin layer 52.

TABLE 1

|  | ESR (mΩ) |
| --- | --- |
| Working Example 1 (Capacitor of Present Invention) | 8.5 |
| Working Example 2 (Capacitor of Present Invention) | 5.2 |
| Comparative Example 1 | 5.0 |
| Comparative Example 2 | 25.4 |

The present invention is not limited to the aforementioned preferred embodiments, and various types of modifications may be made without departing from the scope and spirit of the present invention.

While preferred embodiments of the invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising: a laminated ceramic multilayer body including a first plurality of ceramic dielectric layers provided with first inner electrodes on surfaces thereof, a second plurality of ceramic dielectric layers provided with second inner electrodes on surfaces thereof, a third plurality of ceramic dielectric layers provided with no inner electrodes, a first principal surface and a second principal surface opposing each other in a lamination direction of the ceramic multilayer body, a first side surface and a second side surface opposing each other in a width direction perpendicular or substantially perpendicular to the lamination direction, and a first end surface and a second end surface opposing each other in a lengthwise direction perpendicular or substantially perpendicular to the lamination direction and the width direction; a first outer electrode provided on the first end surface of the ceramic multilayer body on which the first inner electrodes are exposed, and end portions of the first outer electrode extend to the first and second principal surfaces and the first and second side surfaces of the ceramic multilayer body; and a second outer electrode provided on the second end surface of the ceramic multilayer body on which the second inner electrodes are exposed, and end portions of the second outer electrode extend to the first and second principal surfaces and the first and second side surfaces of the ceramic multilayer body; wherein the first outer electrode includes: a first base electrode layer including a conductive metal and a glass component disposed on the ceramic multilayer body; a first conductive resin layer including a thermosetting resin and a metal component disposed on the first base electrode layer such that an exposed portion of the first base electrode layer is exposed through the first conductive resin layer at least at one corner on the first end surface side of the ceramic multilayer body; and a first plating layer disposed on the first conductive resin layer and the exposed portion of the first base electrode layer; wherein the exposed portion of the first base electrode layer is in direct contact with the first plating layer at least at the one corner on the first end surface side of the ceramic multilayer body; and the second outer electrode includes: a second base electrode layer including a conductive metal and a glass component disposed on the ceramic multilayer body; a second conductive resin layer including a thermosetting resin and a metal component disposed on the second base electrode layer such that an exposed portion of the second base electrode layer is exposed through the second conductive resin layer at least at one corner on the second end surface side of the ceramic multilayer body; and a second plating layer disposed on the second conductive resin layer and the exposed portion of the second base electrode layer; wherein the exposed portion of the second base electrode layer is in direct contact with the second plating layer at least at the one corner on the second end surface side of the ceramic multilayer body.

2. The multilayer ceramic capacitor according to claim 1, wherein the one corner on the first end surface side of the ceramic multilayer body is included within four corners on the first end surface side of the ceramic multilayer body; the one corner on the second end surface side of the ceramic multilayer body is included within four corners on the second end surface side of the ceramic multilayer body; the exposed portion of the first base electrode layer is exposed through the first conductive resin layer at each of the four corners on the first end surface side of the ceramic multilayer body and is in direct contact with the first plating layer; and the exposed portion of the second base electrode layer is exposed through the second conductive resin layer at each of the four corners on the second end surface side of the ceramic multilayer body and is in direct contact with the second plating layer.

3. The multilayer ceramic capacitor according to claim 2, wherein the exposed portion of the first base electrode layer is exposed through the first conductive resin layer at the four corners and four ridge-line portions on the first end surface side of the ceramic multilayer body and is in direct contact with the first plating layer; and the exposed portion of the second base electrode layer is exposed through the second conductive resin layer at the four corners and four ridge-line portions on the second end surface side of the ceramic multilayer body and is in direct contact with the second plating layer.

4. The multilayer ceramic capacitor according to claim 1, wherein
a first section where the exposed portion of the first base electrode layer is in direct contact with the first plating layer extends toward a center portion of the first end surface of the ceramic multilayer body; and
a second section where the exposed portion of the second base electrode layer is in direct contact with the second plating layer extends toward a center portion of the second end surface of the ceramic multilayer body.

5. The multilayer ceramic capacitor according to claim 4, wherein
the first section is not located in the center portion of the first end surface of the ceramic multilayer body; and
the second section is not located in the center portion of the second end surface of the ceramic multilayer body.

6. The multilayer ceramic capacitor according to claim 5, wherein
the exposed portion of the first base electrode layer includes a ring-shaped or substantially ring-shaped configuration; and
the exposed portion of the second base electrode layer includes a ring-shaped or substantially ring-shaped configuration.

7. The multilayer ceramic capacitor according to claim 1, wherein a protrusion is provided in a center portion of the first outer electrode.

8. The multilayer ceramic capacitor according to claim 1, wherein a protrusion is provided in a center portion of the second outer electrode.

9. The multilayer ceramic capacitor according to claim 1, wherein
the first plating layer includes at least two first plating layers; and
the second plating layer includes at least two second plating layers.

10. The multilayer ceramic capacitor according to claim 1, wherein
the first outer electrode is disposed such that the first base electrode is disposed on the ceramic multilayer body, the first conductive resin layer is disposed on the first base electrode, and the first plating layer is disposed on the first conductive resin layer in that order; and
the second outer electrode is disposed such that the second base electrode is disposed on the ceramic multilayer body, the second conductive resin layer is disposed on the second base electrode, and the second plating layer is disposed on the second conductive resin layer in that order.

11. The multilayer ceramic capacitor according to claim 1, wherein a thickness of each of the first, second, and third plurality of ceramic dielectric layers is no less than about 0.5 µm and no more than about 10 µm.

12. The multilayer ceramic capacitor according to claim 1, wherein the metal component included in the first conductive resin layer and the metal component included in the second conductive resin layer is at least one of Ag, Cu, an alloy of these metals, and a metal powder including a surface coated with Ag.

13. The multilayer ceramic capacitor according to claim 12, wherein
the metal component included in the first conductive resin layer and the metal component included in the second conductive resin layer is the metal powder including the surface coated with Ag; and
the metal powder is at least one of Cu and Ni.

14. The multilayer ceramic capacitor according to claim 9, wherein
the at least two first plating layers include a first Ni plating layer and a first Sn plating layer; and
the at least two second plating layers include a second Ni plating layer and a second Sn plating layer.

15. The multilayer ceramic capacitor according to claim 1, wherein
the exposed portion of the first base electrode layer includes a crescent or substantially crescent shape; and
the exposed portion of the second base electrode layer includes a crescent or substantially crescent shape.

16. The multilayer ceramic capacitor according to claim 6, wherein the ring-shaped or substantially ring-shaped configuration of the exposed portion of the first base electrode layer and the exposed portion of the second base electrode layer is rectangular or substantially rectangular.

17. The multilayer ceramic capacitor according to claim 1, wherein
the first conductive resin layer includes a first thickness that is no less than about 3 µm and no more than about 20 µm and a second thickness that is no less than about 20 µm and no more than about 100 µm; and
the second conductive resin layer includes a first thickness that is no less than about 3 µm and no more than about 20 µm and a second thickness that is no less than about 20 µm and no more than about 100 µm.

18. The multilayer ceramic capacitor according to claim 1, wherein
a ratio of a length of the section where the first plating layer is in direct contact with the exposed portion of the first base electrode layer to a length of a surface of the first base electrode layer is equal to, substantially equal to, or more than about 20%; and
a ratio of a length of the section where the second plating layer is in direct contact with the exposed portion of the second base electrode layer to a length of a surface of the second base electrode layer is equal to, substantially equal to, or more than about 20%.

19. The multilayer ceramic capacitor according to claim 1, wherein
each of the first, second, and third plurality ceramic dielectric layers include a dielectric ceramic including a primary component and a secondary component;
the primary component is one of $BaTiO_3$, $CaTiO_3$, $SrTiO_3$, or $CaZrO_3$; and
the secondary component is one of a Mn compound, an Fe compound, a Cr compound, a Co compound, and a Ni compound.

20. The multilayer ceramic capacitor according to claim 1, wherein
a thickness of the first base electrode layer is no less than about 10 µm and no more than about 50 µm at a portion of the first base electrode layer including the largest thickness of the first base electrode layer; and
a thickness of the second base electrode layer is no less than about 10 µm and no more than about 50 µm at a portion of the second base electrode layer including the largest thickness of the second base electrode layer.

* * * * *